United States Patent
Teratani (10) Patent No.: US 10,175,143 B2
(45) Date of Patent: Jan. 8, 2019

(54) DISPLAY OF A METER DURING AN UPSHIFT

(71) Applicant: TOYOTA JIDOSHA KABUSHIKI KAISHA, Toyota-shi, Aichi-ken (JP)

(72) Inventor: Yoshiyuki Teratani, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 60 days.

(21) Appl. No.: 15/450,301

(22) Filed: Mar. 6, 2017

(65) Prior Publication Data

US 2017/0268961 A1 Sep. 21, 2017

(30) Foreign Application Priority Data

Mar. 18, 2016 (JP) .................. 2016-056175

(51) Int. Cl.
| | | |
|---|---|---|
| *G01M 15/04* | (2006.01) | |
| *B60K 35/00* | (2006.01) | |
| *B60K 37/02* | (2006.01) | |
| *F16H 59/00* | (2006.01) | |
| *B60W 30/19* | (2012.01) | |
| *F16H 61/36* | (2006.01) | |
| *G01P 1/08* | (2006.01) | |
| *G01P 1/10* | (2006.01) | |
| *F02D 41/02* | (2006.01) | |
| *F02D 31/00* | (2006.01) | |

(52) U.S. Cl.
CPC .......... *G01M 15/046* (2013.01); *B60K 35/00* (2013.01); *B60K 37/02* (2013.01); *B60W 30/19* (2013.01); *F16H 59/00* (2013.01); *F16H 61/36* (2013.01); *G01P 1/08* (2013.01); *G01P 1/10* (2013.01); *B60K 2350/1064* (2013.01); *F02D 31/009* (2013.01); *F02D 41/023* (2013.01)

(58) Field of Classification Search
USPC ........................................ 73/114.25
See application file for complete search history.

(56) References Cited

U.S. PATENT DOCUMENTS

| | | | |
|---|---|---|---|
| 9,696,333 B2* | 7/2017 | Teratani .................... G01P 1/07 |
| 9,897,625 B2* | 2/2018 | Teratani .................... G01P 1/07 |
| 2014/0229076 A1* | 8/2014 | Doering .................. F16H 63/42 |
| | | | 701/48 |
| 2017/0341570 A1* | 11/2017 | Teratani ................. B60Q 1/447 |

FOREIGN PATENT DOCUMENTS

| | | |
|---|---|---|
| JP | 2004-325108 A | 11/2004 |
| JP | 2009-220678 A | 10/2009 |

\* cited by examiner

*Primary Examiner* — Eric S McCall
(74) *Attorney, Agent, or Firm* — Oliff PLC (57) ABSTRACT

A target reaching rotational speed set during a torque phase is set to a value higher than an actual engine rotational speed, the value being higher as one of a vehicle acceleration and an engine rotational speed gradient is larger. That is, as the acceleration is steeper, the target reaching rotational speed is set to a value closer to an upper limit rotational speed or rotational speeds proximate thereto. Thus, a display rotational speed displayed on a tachometer at the end of the torque phase becomes high rotational speed. Accordingly, there is provided a display control device for a vehicle that enables a driver to feel the use of engine performance to the limit.

4 Claims, 4 Drawing Sheets

DISPLAY OF A METER DURING AN UPSHIFT

CROSS-REFERENCE TO RELATED APPLICATIONS

This application claims priority to Japanese Patent Application No. 2016-056175 filed on Mar. 18, 2016, the entire contents of which are hereby incorporated by reference.

BACKGROUND

1. Technical Field

The present disclosure relates to a display control device for a vehicle, and more particularly relates to display of a meter during an upshift.

2. Description of Related Art

There has been known a display control device provided in a vehicle including an engine and an automatic transmission, the device being configured to display engine rotational speed on a meter. The engine rotational speed display device is disclosed in Japanese Patent Application Publication No. 2009-220678. In the engine rotational speed display device disclosed in Japanese Patent Application Publication No. 2009-220678, responsiveness of engine rotational speed for display (meter-displayed rotational speed) corresponding to change in actual engine rotational speed (real engine rotational speed) during shifting is enhanced by displaying not the real engine rotational speed but estimated engine rotational speed obtained by calculation during an inertia phase.

SUMMARY

When the real engine rotational speed reaches a preset upper limit rotational speed, fuel cut is forcibly executed to stop fuel injection in order to protect the engine. As a result, driving force decreases and shocks are given to the vehicle. In order to prevent such a situation, rotational speed decrease due to an upshift is set to be started before the real engine rotational speed reaches the upper limit rotational speed in consideration of factors such as variation in components of each vehicle.

When a driver operates an accelerator with a high opening, rotational speed decrease due to an upshift occurs after the meter-displayed rotational speed reaches an upper limit rotational speed or reaches rotational speeds proximate thereto. As a result, the driver can feel use of engine performance to the limit. On the contrary, in the conventional control, the real engine rotational speed is displayed as the meter-displayed rotational speed in a torque phase. Accordingly, even when the driver operates the accelerator with a high opening, the meter-displayed rotational speed does not reach the upper limit rotational speed nor the rotational speeds proximate thereto before rotational speed decrease due to an upshift occurs (at the end of the torque phase). Therefore, the driver cannot feel the use of engine performance to the limit.

The present disclosure has been made in view of the above circumstances, and it is therefore an object of the present disclosure to provide a display control device for a vehicle including an engine and an automatic transmission, the display control device being capable of displaying meter-displayed rotational speed during an upshift without imparting a sense of incongruity to a driver.

Accordingly, in one aspect of the present disclosure, there is provided a display control device for a vehicle including an engine and an automatic transmission, the display control device being configured to display engine rotational speed of the engine on a meter. The display control device includes an electronic control unit. The electronic control unit is configured to: (i) set a maximum display rotational speed to be displayed on the meter at an end of a torque phase of an upshift of the automatic transmission when a start condition of the upshift is satisfied, (ii) set the maximum display rotational speed to a value higher than actual engine rotational speed, and (iii) make the maximum display rotational speed higher as at least one of vehicle acceleration and engine rotational speed gradient is larger at a time when the start condition of the upshift is satisfied, (iv) calculate the display rotational speed such that the display rotational speed displayed on the meter at the end of the torque phase becomes the maximum display rotational speed, (v) display the calculated display rotational speed on the meter.

According to the display control device as described above, the maximum display rotational speed set in the torque phase is set to a value higher than the actual engine rotational speed, the value being higher as one of the vehicle acceleration and the engine rotational speed gradient is larger. That is, as the acceleration is steeper, the maximum display rotational speed is set to a value closer to the upper limit rotational speed or the rotational speeds proximate thereto. Accordingly, the display rotational speed displayed on the meter at the end of the torque phase becomes high rotational speed, which enables the driver to feel use of engine performance to the limit. Moreover, since the display rotational speed becomes the maximum display rotational speed at the end of the torque phase, it becomes possible to coincide decrease timing of the actual engine rotational speed with decrease timing of the display rotational speed. Therefore, it becomes possible to suppress the sense of incongruity imparted to the driver due to deviation of the decrease timing of the actual engine rotational speed from the decrease timing of the displayed rotational speed.

In the display control device, the electronic control unit may be configured to calculate the display rotational speed based on the actual engine rotational speed without setting the maximum display rotational speed when at least one of accelerator opening, throttle opening, the vehicle acceleration, and the engine rotational speed gradient is equal to or less than a specified value.

According to the display control device as described above, when a moderate acceleration is requested, rotational speed decrease due to an upshift is started before the engine rotational speed becomes a high rotational speed in consideration of fuel efficiency and the like. Accordingly, when at least one of the accelerator opening, the throttle opening, the vehicle acceleration, and the engine rotational speed gradient is not high, the display rotational speed is calculated based on actual engine rotational speed, which prevents high rotational speed from being displayed as the display rotational speed. Therefore, it becomes possible to suppress the sense of incongruity imparted to a driver due to display of high rotational speed even though requested acceleration is not high.

In the display control device, the electronic control unit may be configured to: (i) calculate the display rotational speed by applying smoothing with the maximum display rotational speed as a target rotational speed, and (ii) make a smoothing amount representing a smoothing degree smaller as at least one of the vehicle acceleration and the engine rotational speed gradient is larger.

According to the vehicle display control device as described above, as the vehicle acceleration or the engine rotational speed gradient is larger in smoothing, the smoothing amount becomes smaller. Accordingly, as the vehicle acceleration or the engine rotational speed gradient is larger, change in the display rotational speed becomes larger. Therefore, it becomes possible to suppress the sense of incongruity imparted to the driver due to mild change in the display rotational speed even though the vehicle acceleration or the engine rotational speed gradient is large.

In the display control device, the electronic control unit may be configured to: (i) calculate the maximum display rotational speed by subtracting a specified value from a preset upper limit rotational speed, and (ii) set the specified value smaller as at least one of the vehicle acceleration and the engine rotational speed gradient is larger at a time when the start condition of the upshift is satisfied.

According to the display control device as described above, as the vehicle acceleration or the engine rotational speed gradient is larger at the time when the start condition of an upshift is satisfied, the maximum display rotational speed becomes higher. As a result, an adequate maximum display rotational speed corresponding to the state of the vehicle is set.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinbelow, an embodiment of the present disclosure will be described in detail with reference to the accompanying drawings. In the following embodiment, the drawings are simplified or deformed as necessary, and therefore the details of each component, such as a proportion, and a form, may be different from those of real components.

Figure 1:
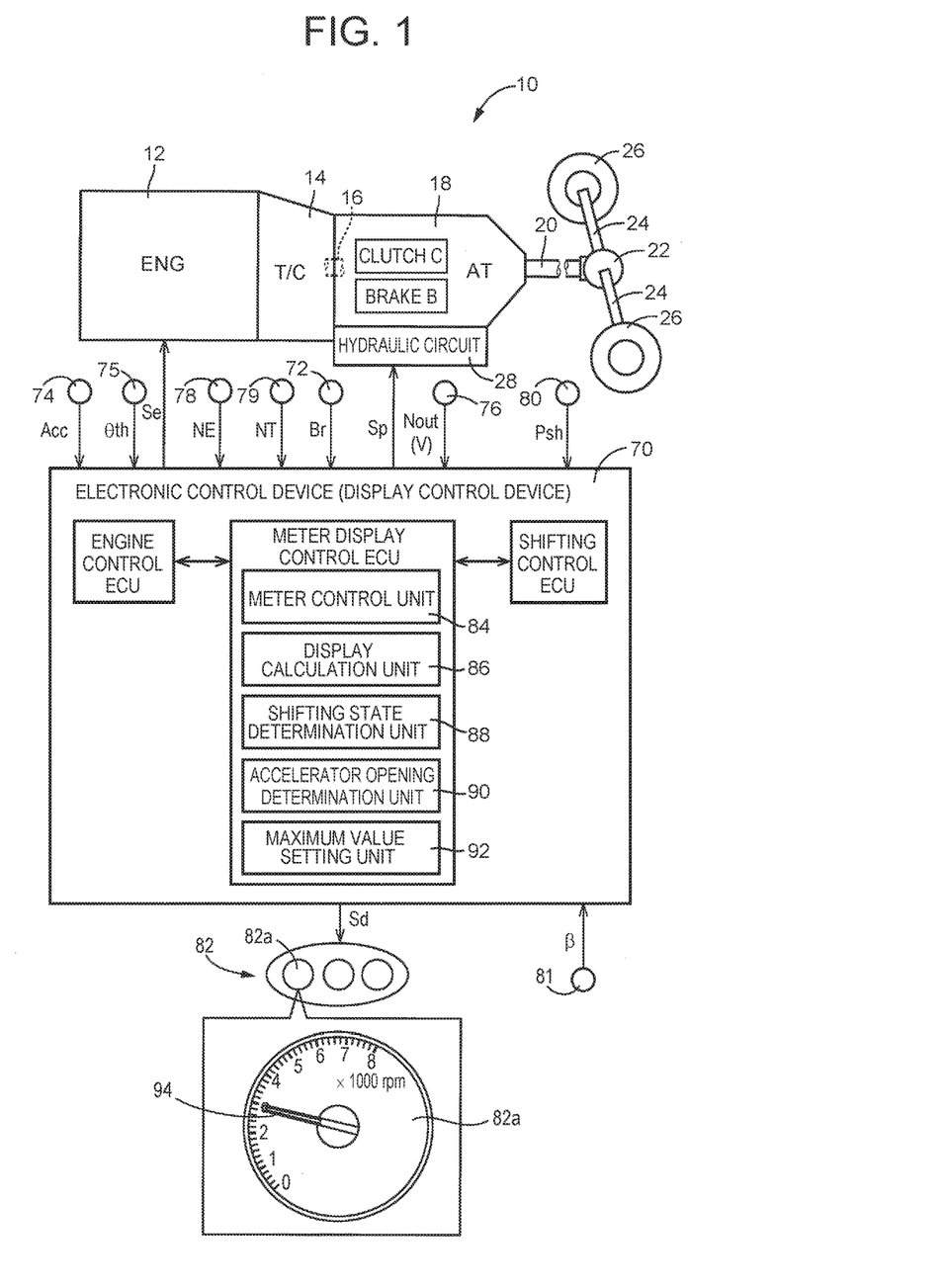
FIG. 1 is an explanatory view of an outlined configuration of a power transmission line extending from an engine to driving wheels included in a vehicle to which a display control device of an embodiment as one example of the present disclosure is applied, the view being an explanatory view of a principal part of a control system provided in the vehicle.

FIG. 1 is an explanatory view of an outlined configuration of a power transmission line extending from an engine 12 to driving wheels 26 included in a vehicle 10 to which a display control device of the present embodiment is applied, the view being also an explanatory view of a principal part of a control system provided in the vehicle 10. In FIG. 1, motive power generated in the engine 12 serving as a driving force source passes through a torque converter 14 and an input shaft 16, and is input into an automatic transmission 18 from the input shaft 16. The motive power is then transferred from an output shaft 20 of the automatic transmission 18, passes through components, such as a differential gear unit (differential gear) 22 and a pair of axle shafts (drive shafts) 24, in sequence and into right and left driving wheels 26.

The automatic transmission 18 is a publicly known planetary gear-type automatic transmission having one or more pairs of planetary gear drives and a plurality of hydraulic engagement devices inside a transmission case serving as a non-rotation member attached to a vehicle body, the hydraulic engagement devices causing a plurality of shift stages (gear stages) different in shift ratio (gear ratio) γ (=transmission input rotational speed Ni/transmission output rotational speed Nout) to be selected in an alternative manner. For example, the automatic transmission 18 is a stepped automatic transmission configured to execute so-called a clutch-to-clutch shifting, in which shifting is executed by re-engagement between any of the plurality of hydraulic engagement devices (i.e., by switching engagement and disengagement of the hydraulic engagement devices). The plurality of hydraulic engagement devices are each a hydraulic friction engagement device configured to transfer rotation and torque between the input shaft 16 that receives motive power from the engine 12 and the output shaft 20 that transmits motive power to the driving wheels 26. Although the input shaft 16 is an input shaft of the automatic transmission 18, it is also a turbine shaft rotationally driven by turbine wheels of the torque converter 14.

Examples of the hydraulic engagement devices include a clutch C and a brake B, whose engagement and disengagement are each controlled by a hydraulic circuit 28, the hydraulic circuit 28 including components such as a solenoid valve for pressure regulation to change torque capacity or engagement force of the respective hydraulic engagement devices, so that members arranged on both sides of the hydraulic engagement devices are selectively coupled.

The vehicle 10 includes a display control device 70 (which is hereinafter also referred to as an electronic control unit 70) that is an electronic control unit illustrates in FIG. 1. The electronic control unit 70 is configured to include a so-called microcomputer including a CPU, a RAM, a ROM, and an input-output interface. The CPU is configured to perform signal processing in accordance with programs prestored in the ROM while utilizing a temporary storage function of the RAM so as to execute control, such as output control of the engine 12 and shifting control of the automatic transmission 18. The electronic control unit 70 is configured to be divided into subunits such as an engine control ECU, a shifting control ECU, and a meter display control ECU. The engine control ECU controls output of the engine 12 as necessary. The shifting control ECU controls shifting in the automatic transmission 18. The meter display control ECU controls display of various meters.

The electronic control unit 70 receives supply of signals including a signal indicative of an operation amount Br of a foot brake pedal, a signal indicative of accelerator opening Acc, a signal indicative of throttle opening θth of an electronic throttle valve, a signal indicative of vehicle rotational speed V, a signal indicative of engine rotational speed NE, a signal indicative of turbine rotational speed NT, a signal indicative of a shift position Psh from a shift operation device, and a signal indicative of longitudinal acceleration β of the vehicle 10. The signal indicative of the operation amount Br corresponds to brake stepping force detected by a brake switch 72. The signal indicative of the accelerator opening Acc is an operation amount of the accelerator pedal as an acceleration request amount (a driver request amount) by a driver to the vehicle 10 detected by an accelerator opening sensor 74. The signal indicative of the throttle opening θth is detected by a throttle opening sensor 75. The signal indicative of the vehicle rotational speed V corresponds to the rotational speed Nout of the output shaft 20 in the automatic transmission 18 detected by a vehicle rotational speed sensor 76. The signal indicative of the engine rotational speed NE is the rotational speed of the engine 12 detected by an engine rotational speed sensor 78. The signal indicative of the turbine rotational speed NT corresponds to a turbine shaft (equivalent to the input shaft 16) of the torque converter 14 detected by a turbine rotational speed sensor 79. The signal indicative of the shift position Psh is detected by a shift position sensor 80. The signal indicative of the longitudinal acceleration β is detected by an acceleration sensor 81.

The electronic control unit 70 outputs signals such as an engine output control command signal Se for output control of the engine 12, a shifting control command signal Sp for shifting control in the automatic transmission 18, and display command signals Sd for display of various meters 82 (such as a speedometer, a tachometer, and a fuel gauge) provided on an in-vehicle display device.

The meter display control ECU, which is one of the component members of the electronic control unit 70, functionally includes a meter control unit 84, a display calculation unit 86, a shifting state determination unit 88, an accelerator opening determination unit 90, and a maximum value setting unit 92.

The meter control unit 84 displays a display engine rotational speed NEMET (which is hereinafter referred to as a display rotational speed NEMET) calculated by the later-described display calculation unit 86, the display engine rotational speed NEMET being displayed at any time on a tachometer 82a constituting the various meters 82. As illustrated in FIG. 1, the tachometer 82a is made of scales indicative of the magnitude of the engine rotational speed NE displayed along a circumference of the tachometer 82a, and a rotatable needle 94 that points the scales. The meter control unit 84 executes control such that a distal end of the needle 94 points to a calculated display rotational speed NEMET.

The display calculation unit 86 calculates the display rotational speed NEMET displayed on the tachometer 82a at any time. For example, in a traveling state where shifting in the automatic transmission 18 is not performed, the display calculation unit 86 sets actual engine rotational speed NE (which is hereinafter referred to as real engine rotational speed NE) calculated based on a signal (information) from the engine rotational speed sensor 78 as a target rotational speed NESFT of the meter. Furthermore, the display calculation unit 86 applies proper smoothing (such as change amount restriction, and a primary delay filter) to the target rotational speed NESFT to calculate the display rotational speed NEMET. By applying smoothing, a rapid change in the display rotational speed NEMET is suppressed.

When an inertia phase is started during an upshift of the automatic transmission 18, the real engine rotational speed NE decreases. Generally, when the real engine rotational speed NE reaches a preset upper limit rotational speed NERED, a fuel cut is forcibly executed to stop fuel injection for protection of the engine. In order to prevent shocks caused by the fuel cut executed during the upshift, rotational speed decrease is set to be started before the real engine rotational speed NE reaches the upper limit rotational speed NERED. If such control is executed when the real engine rotational speed NE is displayed as the display rotational speed NEMET as before, the display rotational speed NEMET displayed on the tachometer 82a deviates from the upper limit rotational speed NERED even though the driver steps on the accelerator pedal with a high opening. Accordingly, the driver cannot feel the use of engine performance to the limit.

As a solution, the display calculation unit 86 calculates the display rotational speed NEMET displayed on the tachometer 82a during an upshift in the automatic transmission 18 (during upshifting) as described in the following.

With reference again to FIG. 1, the shifting state determination unit 88 is executed during an upshift of the automatic transmission 18 to determine whether or not the upshift is in the inertia phase. Whether or not the upshift is in the inertia phase is determined based on whether or not gradient of the turbine rotational speed NT is switched to a negative gradient, for example.

First, a description is given of the case where an upshift is conducted not in the inertia phase, i.e., an upshift is conducted in the torque phase. When it is determined that the upshift is conducted in the torque phase, the accelerator opening determination unit 90 determines whether or not the accelerator opening Acc that is the operation amount of the accelerator pedal is equal to or less than a specified value a that is set in advance. The specified value a of the accelerator opening Acc, which is obtained in an experiment or analysis in advance, is set to a threshold of a high opening region in which the display rotational speed NEMET preferably reaches an upper limit rotational speed RED or rotational speeds proximate thereto during the upshift.

When the accelerator opening Acc is determined to be equal to or less than the specified value a, the display calculation unit 86 sets the target rotational speed NESFT to the real engine rotational speed NE. The display rotational speed NEMET is calculated by applying smoothing based on an absolute value (=|NEMET(i−1)−NESFT|) of a difference between a set target rotational speed NESFT and a display rotational speed calculated in a previous time step NEMET(i−1). For example, the display rotational speed NEMET (referred to as a display rotational speed NEMET(i) for convenience sake) subjected to smoothing (change amount restriction) based on Expression (1) is calculated. Note that NEMET(i−1) represents the display rotational speed NEMET calculated in the previous time step. A coefficient X (0≤X≤1) functions as a coefficient for determining a change amount from the display rotational speed NEMET(i−1) in the previous time step.

$$NEMET(i)=NEMET(i-1)+(1-X)\times\{|NEMET(i-1)-NESFT|\} \quad (1)$$

Expression (1) is configured to calculate the display rotational speed NEMET by applying smoothing with the target rotational speed NESFT as a target rotational speed. For example, as the coefficient X becomes larger, a smoothing amount becomes larger and a change amount in the display rotational speed NEMET becomes smaller. That is, the coefficient X functions as a coefficient that restricts the amount of change from the display rotational speed NEMET in the previous time step (i−1). As the coefficient X becomes larger, the change amount to be restricted becomes larger (change amount restriction).

When it is determined that the accelerator opening Acc is larger than the specified value a, the maximum value setting unit 92 is executed. The maximum value setting unit 92 is executed when an upshift start condition of the automatic transmission 18 is satisfied and the accelerator opening Acc is larger than the specified value a. The maximum value setting unit 92 then sets a target reaching rotational speed NESFTMAX that is a maximum engine rotational speed desired to be reached (displayed on the tachometer 82a) at the end of the torque phase (at the start of the inertia phase) in the upshift. The target reaching rotational speed NESFTMAX is one example of the maximum display rotational speed of the present disclosure.

The maximum value setting unit 92 calculates the target reaching rotational speed NESFTMAX based on a gradient ΔNE of the engine rotational speed NE at the time when the upshift start condition of the automatic transmission 18 is satisfied (at the time when the start of an upshift is determined) and on the upper limit rotational speed NERED. The target reaching rotational speed NESFTMAX is calculated based on Expression (2) below. Here, the upper limit rotational speed NERED is set in consideration of durability of the engine 12. The upper limit rotational speed NERED is so set that when the real engine rotational speed NE reaches the upper limit rotational speed NERED, fuel cut is executed for engine protection. A value K is a correction amount calculated at any time based on Expression (3) below. Based on Expression (2), the target reaching rotational speed NESFTMAX is calculated by subtracting the specified value K from the upper limit rotational speed NERED.

$$NESFTMAX=NERED-K \text{(provided that } NESFTMAX \leq NERED) \quad (2)$$

$$K=(\Delta NEtgt-\Delta NE) \times m \quad (3)$$

In Expression (3), a value ΔNEtgt is a reference engine rotational speed gradient obtained in an experiment or analysis in advance, the gradient being achieved under a normal (regular) traveling environment. A value m represents a gain, which is set to an adequate value in an experiment or analysis. Based on Expression (3), as the gradient ΔNE is larger, the specified value K becomes smaller. For example, when the engine rotational speed gradient ΔNE becomes a reference gradient ΔNEtgt, the specified value K becomes zero from Expressions (2) and (3). As a result, the target reaching rotational speed NESFTMAX set to the upper limit rotational speed NERED. Here, the gradient ΔNE becomes smaller than the reference gradient ΔNEtgt when the vehicle travels under the environment where the engine torque during traveling decreases and the engine rotational speed NE hardly increases, such as under low pressure environment in highland or under high outside air temperature environment.

The maximum value setting unit 92 calculates the gradient ΔNE of the engine rotational speed NE at the time when the start of an upshift is determined, and calculates the correction amount K based on the calculated gradient ΔNE and Expression (3). Furthermore, the maximum value setting unit 92 applies the calculated correction amount K to Expression (2) to calculate the target reaching rotational speed NESFTMAX. For example, when the calculated gradient ΔNE is equal to or proximate to the reference engine rotational speed gradient NEtgt, the target reaching rotational speed NESFTMAX is set to the upper limit rotational speed NERED or rotational speeds proximate thereto. Meanwhile, under the environment where the gradient ΔNE decreases, such as under the low pressure environment, the target reaching rotational speed NESFTMAX becomes lower than the upper limit rotational speed NERED. Thus, the target reaching rotational speed NESFTMAX is determined in accordance with the gradient ΔNE. As the gradient ΔNE is larger, the target reaching rotational speed NESFTMAX becomes higher. The gradient ΔNE of the engine rotational speed NE at the time when the start of an upshift is determined is calculated based on past real engine rotational speed NE including the time of starting determination of the upshift.

The correction amount K may be calculated based on vehicle acceleration instead of the engine rotational speed gradient ΔNE. Specifically, the correction amount K is calculated based on Expression (4) below. In Expression (4), a value B is a reference vehicle acceleration obtained by an experiment or analysis in advance, the vehicle acceleration being achieved under the normal (regular) traveling environment. A value n represents a gain, which is set to an adequate value obtained by an experiment or analysis. From Expression (4), as the vehicle acceleration β becomes larger, the specified value K becomes smaller. For example, when the vehicle acceleration β becomes the reference vehicle acceleration B, the specified value K becomes zero from Expressions (2) and (4). As a result, the target reaching rotational speed NESFTMAX is set to the upper limit rotational speed NERED. As the vehicle acceleration β becomes lower, the target reaching rotational speed NESFTMAX becomes lower. Thus, the target reaching rotational speed NESFTMAX may be changed in accordance with the vehicle acceleration β, and the target reaching rotational speed NESFTMAX becomes higher as the vehicle acceleration β becomes higher.

$$K=(B-\beta) \times n \quad (4)$$

The display calculation unit 86 sets the calculated target reaching rotational speed NESFTMAX as the target rotational speed NESFT of the meter until the torque phase ends. Furthermore, the display calculation unit 86 calculates a display rotational speed NEMET(i) by applying smoothing, based on the absolute value (=|NEMET(i−1)−NESFT|) of the difference between the set target rotational speed NESFT and the display rotational speed NEMET (i−1) calculated in a previous time step and further in consideration of the engine rotational speed gradient ΔNE. For example, the display rotational speed NEMET(i) is obtained by applying smoothing (change amount restriction) based on Expression (5) below.

$$NEMET(i)=NEMET(i-1)+(1-Y) \times \{|NEMET(i-1)-NESFT|\} \quad (5)$$

In Expression (5), a coefficient Y (0≤Y≤1) corresponds to a coefficient that determines a preset change amount (smoothing amount). Expression (5) is configured to calculate the display rotational speed NEMET by applying smoothing with the target rotational speed NESFT (substantially the target reaching rotational speed NESFTMAX) as a target rotational speed. For example, as the coefficient Y becomes larger, the smoothing amount becomes larger and change in the display rotational speed NEMET becomes smaller. The coefficient Y is set to a value in the range where the target rotational speed NESFT (target reaching rotational speed NESFTMAX) is reached at the time when the torque phase is ended, that is, at the time when the inertia phase is started. For example, a period of time from the time when the start of shifting is determined to the time when the inertia phase is started is experimentally obtained in advance for each gear stage and vehicle speed V. Then, the coefficient Y that enables the display rotational speed NEMET to reach the target rotational speed NESFT within the above period of time is experimentally obtained and stored in advance.

Furthermore, the coefficient Y is also changed by the engine rotational speed gradient ΔNE. For example, when the engine rotational speed gradient ΔNE is large, the change in the display rotational speed NEMET may preferably be in proportion to the engine rotational speed gradient ΔNE. Accordingly, it is so set that the coefficient Y that defines the smoothing amount becomes smaller as the engine rotational speed gradient ΔNE becomes larger. When the coefficient Y is made smaller, the smoothing amount becomes smaller and the change in the display rotational speed NEMET becomes larger as the engine rotational speed gradient ΔNE becomes larger. The coefficient Y is stored as a relation map including the vehicle speed V, the gear stage, and the engine rotational speed gradient ΔNE as parameters. Thus, when the coefficient Y is changed in accordance with the engine rotational speed gradient ΔNE, the display rotational speed NEMET further adjusted to the behavior of the vehicle is calculated.

Instead of the engine rotational speed gradient ΔNE, the coefficient Y may be changed in accordance with the vehicle acceleration β. When the vehicle acceleration β is large, the change in the display rotational speed NEMET may preferably be in proportion to the vehicle acceleration β. Accordingly, it is so set that the coefficient Y can be made smaller and the smoothing amount becomes smaller, i.e., the change in the display rotational speed NEMET becomes larger, as the vehicle acceleration β is larger. Thus, when the coefficient Y is changed in accordance with the vehicle acceleration β, the display rotational speed NEMET further adjusted to the behavior of the vehicle is calculated.

In the torque phase, the display calculation unit 86 calculates the display rotational speed NEMET based on Expressions (2) to (5). Therefore, at the end of the torque phase, the display rotational speed NEMET becomes the target reaching rotational speed NESFTMAX, and furthermore, the display rotational speed NEMET matched with the behavior of the vehicle (the engine rotational speed gradient ΔNE or the vehicle acceleration β) is calculated.

A description is now given of calculation of the display rotational speed NEMET in the inertia phase. In the inertia phase, the target rotational speed NESFT is calculated based on Expression (6) below. Herein, Expression (6) is described. A turbine rotational speed NT corresponding to a gear stage after shifting is added to a difference (=NE−NT) between the real engine rotational speed NE and the turbine rotational speed NT at the time when the inertia phase is started to obtain a value (=NT after shifting+(NE−NT)), and the obtained value is set as a target rotational speed NESFT. The turbine rotational speed NT after shifting is calculated as a product (=Nout×γ) of a gear ratio γ of the gear stage after shifting and a rotational speed Nout of the output shaft 20 of the automatic transmission 18. The display calculation unit 86 applies smoothing to the calculated target rotational speed NESFT by, for example, Expression (1) stated before to calculate the display rotational speed NEMET. Thus, in the present embodiment, during an upshift, calculation methods of the display rotational speed NEMET in the torque phase and the display rotational speed NEMET in the inertia phase are switched.

$$NESFT=NT \text{ after shifting}+(NE-NT) \quad (6)$$

Figure 2:
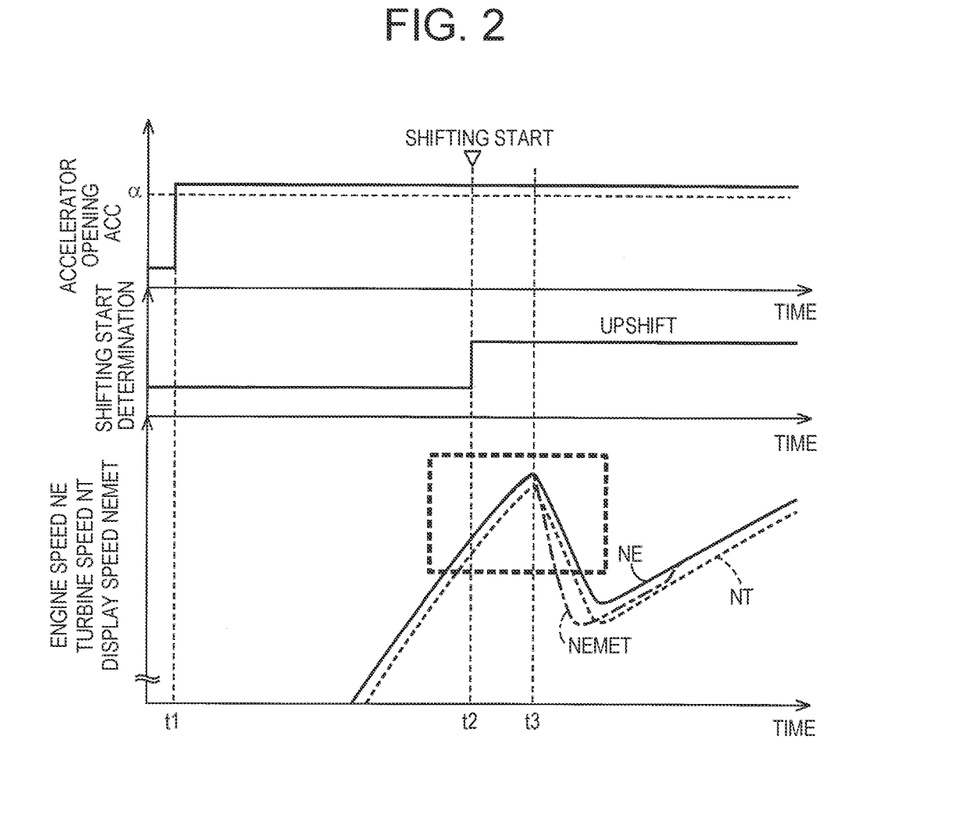
FIG. 2 is a time chart illustrating behavior of engine rotational speed, turbine rotational speed, and display rotational speed of the vehicle when an upshift is executed during traveling with a high accelerator opening.
Figure 3:
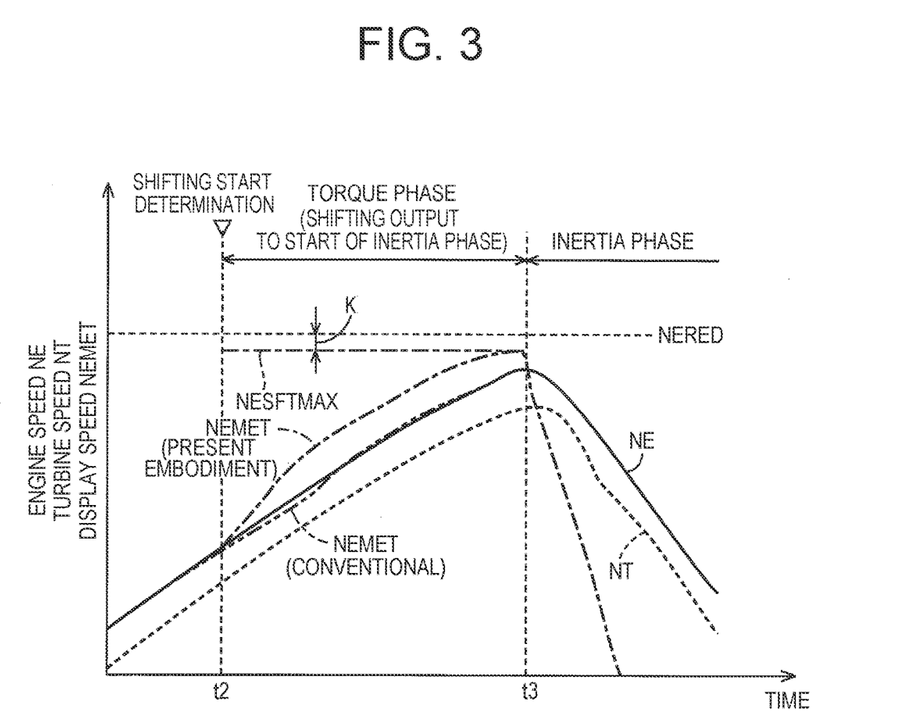
FIG. 3 is a time chart illustrating an enlarged square region surrounded with a broken line in FIG. 2.

FIG. 2 is a time chart illustrating states of the real engine rotational speed NE, the turbine rotational speed NT, and the meter display rotational speed NEMET when an upshift is executed during traveling with a high accelerator opening. FIG. 3 is a time chart illustrating an enlarged square region surrounded with a broken line in FIG. 2. In FIGS. 2 and 3, the torque converter 14 is disengaged. At time t1 in FIG. 2, the accelerator pedal is stepped on, so that the accelerator opening Acc increases (beyond the specified value a). Accordingly, all of the engine rotational speed NE, the turbine rotational speed NT, and the display rotational speed NEMET also increase. In connection to the increase, the vehicle speed V also increases.

With increase of the vehicle speed V, an upshift of the automatic transmission 18 is determined at time t2, and the upshift is started. A period from time t2 to t3 corresponds to the torque phase, in which all of the engine rotational speed NE, the turbine rotational speed NT, and the display rotational speed NEMET increase. A period after time t3 corresponds to the inertia phase, in which all of the engine rotational speed NE, the turbine rotational speed NT, and the display rotational speed NEMET decrease.

In the torque phase, the target reaching rotational speed NESFTMAX illustrated in FIG. 2 is calculated based on Expressions (2) and (3), and the calculated target reaching rotational speed NESFTMAX is set as a target rotational speed NESFT. The target rotational speed NESFT is applied to Expression (5) for smoothing (change amount restriction) so as to obtain a display rotational speed NEMET displayed on the tachometer 82*a*, the display rotational speed NEMET being illustrated with a dashed dotted line. As illustrated in FIG. 3, in the present embodiment, the target rotational speed NESFT is set to be proximate to the upper limit rotational speed NERED. Accordingly, a display rotational speed higher than the real engine rotational speed NE at the end of the torque phase is displayed as the display rotational speed NEMET. At time t3, the torque phase is ended, and the display rotational speed NEMET increases up to the upper limit rotational speed NERED or the rotational speeds proximate thereto. Since the display rotational speed NEMET is displayed on the tachometer 82*a*, a driver who looks at the tachometer 82*a* can feel the use of engine performance to the limit.

Furthermore, the target reaching rotational speed NESFTMAX is reduced by a correction amount K from the upper limit rotational speed NERED based on Expression (3) or (4). Accordingly, under the environment where the engine rotational speed NE hardly increases, such as under the low pressure environment in highland, the display rotational speed NEMET does not reach the upper limit rotational speed NERED like the real engine rotational speed NE. Therefore, the sense of incongruity imparted to the driver is suppressed, the sense of incongruity being caused by the display rotational speed NEMET reaching the upper limit rotational speed NERED during traveling under the environment where the engine rotational speed NE hardly increases, such as under the low pressure environment.

A two-dot chain line of FIG. 3 indicates a conventional display rotational speed NEMET, the display rotational speed NEMET is approximately the same as the real engine rotational speed NE since the real engine rotational speed NE is conventionally set as a target rotational speed NESFT. Therefore, even in the state where, for example, the driver steps on the accelerator pedal with a high opening, the display rotational speed NEMET does not reach the upper limit rotational speed NERED at the end of the torque phase. As a result, the driver cannot feel the use of engine performance to the limit.

At time t3, the inertia phase is started, so that both the engine rotational speed NE and the turbine rotational speed NT decrease. The display rotational speed NEMET is calculated by a calculation method that is applied in the inertia phase. Specifically, the target rotational speed NESFT is calculated by Expression (6), and then smoothing of the calculated target rotational speed NESFT is performed by, for example, Expression (1) to obtain the display rotational speed NEMET.

Figure 4:
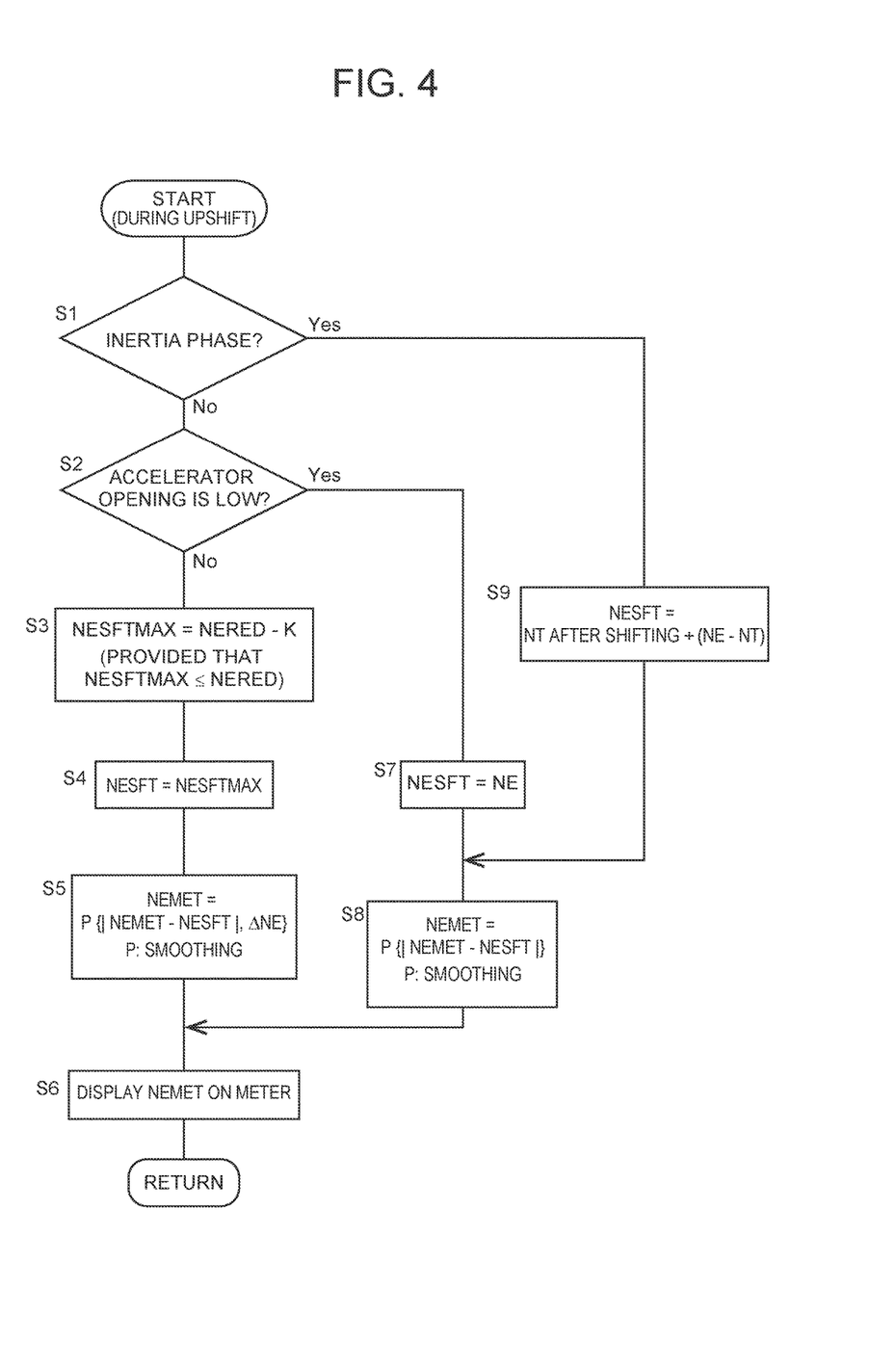
FIG. 4 is a flowchart illustrating control operation for calculating display rotational speed displayed on a tachometer during an upshift, among the control operation of the display control device (electronic control unit) illustrated in FIG. 1.

FIG. 4 is a flowchart illustrating control operation for calculating the display rotational speed NEMET displayed on the tachometer 82a during an upshift of the automatic transmission 18, among the control operation of the electronic control unit 70. The flowchart is repeatedly executed during the upshift.

During an upshift of the automatic transmission 18, first in step S1 (hereinafter a word "step" is omitted) corresponding to the shifting state determination unit 88, it is determined whether the upshift is in the inertia phase or not. When the upshift is in the torque phase, negative determination is made in S1, and the processing proceeds to S2.

In S2 corresponding to the accelerator opening determination unit 90, it is determined whether or not the accelerator opening Acc is low based on whether or not the accelerator opening Acc is equal to or less than the specified value α. When the accelerator opening Acc is equal to or less than the specified value α, positive determination is made in S2. Then, in S7 corresponding to the display calculation unit 86, the target rotational speed NESFT is set to the real engine rotational speed NE. Next, in S8 corresponding to the display calculation unit 86, the target rotational speed NESFT calculated in S7 is subjected to, for example, smoothing by Expression (1) to calculate the display rotational speed NEMET. Then, in S6 corresponding to the meter control unit 84, the calculated display rotational speed NEMET is displayed on the tachometer 82a. Generally, when the accelerator opening Acc is not high, the requested acceleration is not high either, and therefore, rotational speed decrease is started before the real engine rotational speed NE becomes high rotational speed. In this case, by calculating the display rotational speed NEMET with the real engine rotational speed NE as a target rotational speed, it also becomes possible to prevent the display rotational speed NEMET from becoming high.

Again in S2, when the accelerator opening Acc is larger than the specified value α, negative determination is made in S2, and the processing proceeds to S3. In S3 corresponding to the maximum value setting unit 92, the target reaching rotational speed NESFTMAX is calculated based on Expressions (2), (3), or (4). Next, in S4 corresponding to the display calculation unit 86, the target reaching rotational speed NESFTMAX calculated in S3 is set as a target rotational speed NESFT. Then, in S5 corresponding to the display calculation unit 86, the target rotational speed NESFT calculated in S4 is subjected to smoothing by Expression (6) so as to calculate the display rotational speed NEMET. In S6 corresponding to the meter control unit 84, the display rotational speed NEMET calculated in S5 is displayed on the tachometer 82a. Here, in Expression (6), the coefficient Y that defines the smoothing amount is changed in accordance with the engine rotational speed gradient ΔNE or the vehicle acceleration β, so that the display rotational speed NEMET is further adjusted to the behavior of the vehicle. The smoothing amount is a degree of smoothing to be applied, the smoothing amount being a change amount of a value to be smoothed.

Again in S1, when the upshift is in the inertia phase, positive determination is made in S1, and the processing proceeds to S9. In S9 corresponding to the display calculation unit 86, the target rotational speed NESFT in the inertia phase is calculated based on Expression (6). Then in S8 corresponding to the display calculation unit 86, the target rotational speed NESFT calculated in S9 is subjected to smoothing by, for example, Expression (1), to calculate the display rotational speed NEMET. Then, in S6 corresponding to the meter control unit 84, the display rotational speed NEMET calculated in S8 is displayed on the tachometer 82a.

According to the present embodiment as described in the foregoing, the target reaching rotational speed NESFTMAX set in the torque phase is set to a value higher than the actual engine rotational speed NE, the value being higher as one of the vehicle acceleration β and the engine rotational speed gradient ΔNE is larger. That is, as the acceleration is steeper, the target reaching rotational speed NESFTMAX is set to a value closer to the upper limit rotational speed NERED or the rotational speeds proximate thereto. Accordingly, the display rotational speed NEMET displayed on the tachometer 82a at the end of the torque phase becomes high rotational speed, which enables the driver to feel the use of engine performance to the limit. Moreover, since the display rotational speed NEMET becomes the target reaching rotational speed NESFTMAX at the end of the torque phase, it becomes possible to coincide decrease timing of the actual engine rotational speed NEMET with decrease timing of the display rotational speed NEMET. Therefore, it becomes possible to suppress the sense of incongruity imparted to the driver, the sense of incongruity being caused by deviation of the timings, i.e., deviation of the decrease timing of the actual engine rotational speed NEMET from the decrease timing of the display rotational speed NEMET.

According to the present embodiment, when a moderate acceleration is requested, rotational speed decrease due to an upshift is started before the engine rotational speed NE becomes high rotational speed in consideration of fuel efficiency and the like. Accordingly, when the accelerator opening Acc is equal to or less than the specified value a, the display rotational speed NEMET is calculated based on the real engine rotational speed NE, so that the display rotational speed NEMET does not become high rotational speed. Therefore, it becomes possible to suppress the sense of incongruity imparted to the driver due to display of a high rotational speed NEMET even though requested acceleration is not high.

According to the present embodiment, when smoothing is performed, the smoothing amount becomes smaller, as the vehicle acceleration β or the engine rotational speed gradient ΔNE is larger. Accordingly, as the vehicle acceleration β or the engine rotational speed gradient ΔNE is larger, the change in the display rotational speed NEMET becomes larger. Therefore, it becomes possible to suppress the sense of incongruity imparted to the driver due to mild change in the display rotational speed NEMET even though the vehicle acceleration β or the engine rotational speed gradient ΔNE is large.

According to the present embodiment, as the vehicle acceleration β or the engine rotational speed gradient ΔNE is larger at the time when the upshift start condition is satisfied, the target reaching rotational speed NESFTMAX becomes higher. Accordingly, an adequate target reaching rotational speed NESFTMAX corresponding to the state of the vehicle is set.

Although the embodiment of the present disclosure has been described in detail based on the drawings, the present disclosure is also applied to other modes.

For example, in the aforementioned embodiment, when the accelerator opening Acc is equal to or less than the specified value α, it is determined that the requested acceleration is not high, and therefore the target rotational speed NESFT is set to the real engine rotational speed NE. However, the parameter to be used is not limited to the accelerator opening Acc. Specifically, any parameter may properly be applied as long as the magnitude of requested acceleration can be determined. For example, instead of the accelerator opening Acc, any of the throttle opening θth, the vehicle acceleration β, and the engine rotational speed gradient ΔNE may be used as a basis of determination. Or determination may be made based on a plurality of parameters among the accelerator opening Acc, the throttle opening θth, the vehicle acceleration β, and the engine rotational speed gradient ΔNE.

In the aforementioned embodiment, smoothing (change amount restriction) is executed according to the method that restricts the change amount, but the specific method for smoothing is not necessarily limited thereto. For example, smoothing with a publicly known first-order lag filter may also be applied. In the case of using the first-order lag filter, a time constant value that defines change gradient is properly changed in accordance with the vehicle acceleration β or the engine rotational speed gradient ΔNE.

It is to be noted that the embodiment disclosed is merely an example, and the present disclosure may be carried out in modes to which various arrangements and modifications are applied based on the knowledge of those skilled in the art.

What is claimed is:

1. A display control device for a vehicle including an engine and an automatic transmission, the display control device being configured to display engine rotational speed of the engine on a meter, the display control device comprising:
   an electronic control unit configured to:
   (i) set a maximum display rotational speed to be displayed on the meter at an end of a torque phase of an upshift of the automatic transmission when a start condition of the upshift is satisfied,
   (ii) set the maximum display rotational speed to a value higher than actual engine rotational speed,
   (iii) make the maximum display rotational speed higher as at least one of vehicle acceleration and engine rotational speed gradient is larger at a time when the start condition of the upshift is satisfied,
   (iv) calculate the display rotational speed such that the display rotational speed displayed on the meter at the end of the torque phase becomes the maximum display rotational speed, and
   (v) display the calculated display rotational speed on the meter.

2. The display control device according to claim 1, wherein
   the electronic control unit is configured to calculate the display rotational speed based on the actual engine rotational speed without setting the maximum display rotational speed when at least one of accelerator opening, throttle opening, the vehicle acceleration, and the engine rotational speed gradient is equal to or less than a specified value.

3. The display control device according to claim 1, wherein
   the electronic control unit is configured to:
   (i) calculate the display rotational speed by applying smoothing with the maximum display rotational speed as a target rotational speed, and
   (ii) make a smoothing amount representing a smoothing degree smaller as at least one of the vehicle acceleration and the engine rotational speed gradient is larger.

4. The display control device according to claim 1, wherein
   the electronic control unit is configured to:
   (i) calculate the maximum display rotational speed by subtracting a specified value from a preset upper limit rotational speed, and
   (ii) set the specified value smaller as at least one of the vehicle acceleration and the engine rotational speed gradient is larger at a time when the start condition of the upshift is satisfied.

* * * * *